Feb. 7, 1928.
G. ERICSSON
HIGH DUTY VALVE STRUCTURE
Filed April 23, 1927
1,658,374
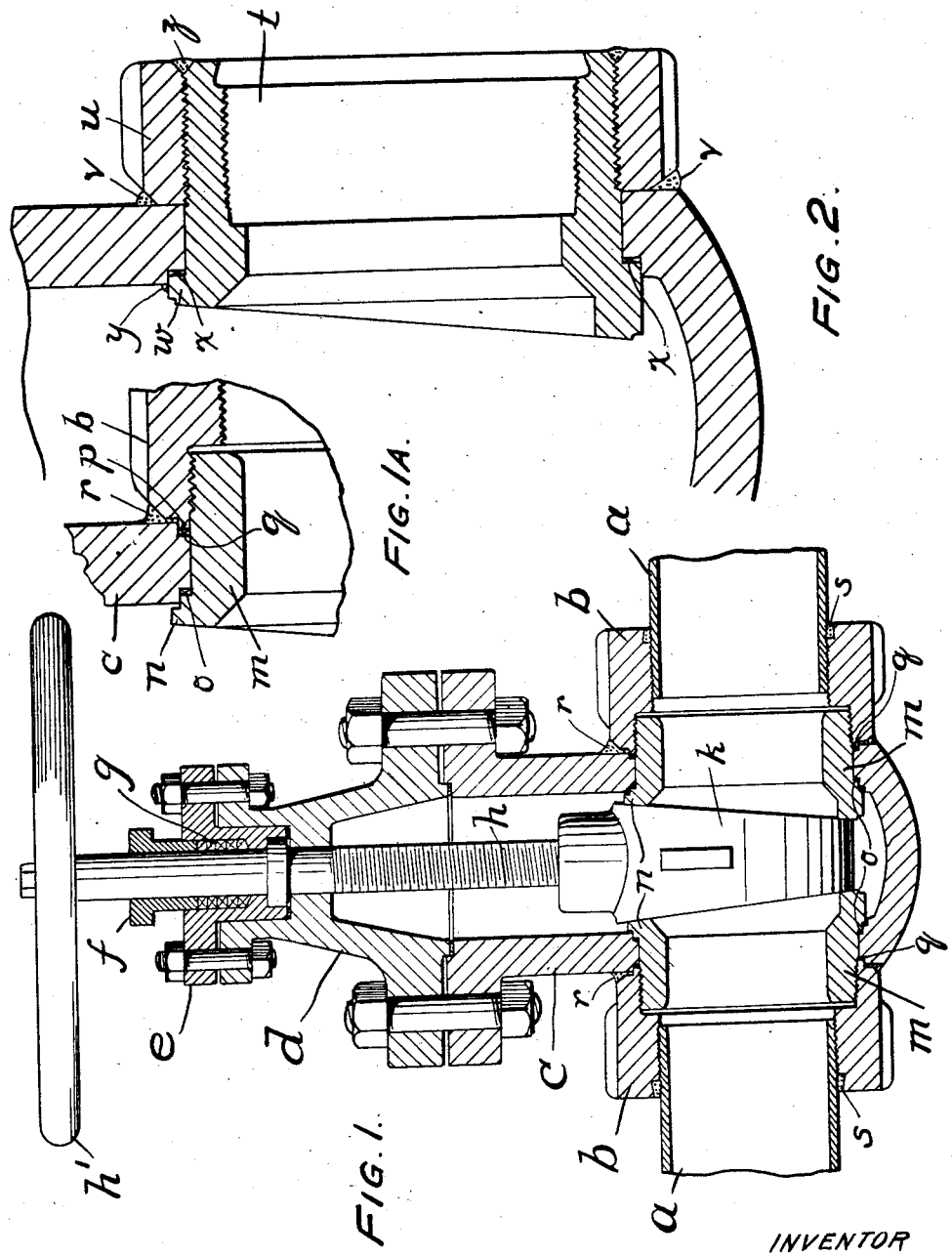
INVENTOR
Gunnar Ericsson
BY
Busser and Harding
ATTORNEYS
WITNESS:
Robt R Kitchel.

Patented Feb. 7, 1928.

1,658,374

UNITED STATES PATENT OFFICE.

GUNNAR ERICSSON, OF PHILADELPHIA, PENNSYLVANIA.

HIGH-DUTY-VALVE STRUCTURE.

Application filed April 23, 1927. Serial No. 186,017.

In valves adapted to control high pressure fluids, as for example, heavy duty valves used in oil well drilling, adequate provision must be made to insure against leakage and escape of the fluid. In that known type of valve structure which comprises a valve casing provided with openings in opposite walls to receive valve seats that are adapted to be engaged by a gate valve that is wedged between them difficulty has been experienced in preventing leakage. The object of my invention is to prevent this leakage and this object is accomplished by the two different means herein shown and described, which are included in one patent because they have inventive features in common; the invention being capable of still other modifications within the scope of the claims.

In the drawings:

Fig. 1 is an elevational section through the valve structure.

Fig. 1<sup>A</sup> is an enlarged vertical section through one wall of the valve casing and one of the valve seats.

Fig. 2 is a view, similar to Fig. 1<sup>A</sup>, of a modification.

First describing the construction of Figs. 1 and 1<sup>A</sup>: the valve casing $c$ is provided on opposite sides with aligning circular openings within which are secured the annular valve seats $m$, $m$, which project within and without said openings. The ends of the valve seats projecting outside the casing are threaded to receive rings $b$, $b$, which function as nuts to hold the valve seats in position and which are internally threaded to engage the ends of the fluid carrying pipes $a$, $a$.

Surmounting the valve casing and bolted thereto is a cover $d$. Surmounting the cover and bolted thereto is a cap $e$.

The valve $k$, which is of the gate type, is disc-shaped and is tapered toward its lower end to have a wedge-like engagement with the correspondingly inclined oppositely facing walls of the valve seats. The valve is threaded on a rod $h$, which extends up through the cover $d$ and cap $e$. The rod also extends through a packing $g$ within cap $e$ and through a gland $f$, which is bolted to cover $d$ by bolts (not shown). At the top, rod $h$ is provided with a hand wheel $h'$, by means of which the rod may be turned in one direction or the other to seat or unseat the valve $k$ on its seats $m$.

That part of the above construction comprising the connection between the valve casing and cover and the connections between the cover and the cap and gland embodies features which form the subject-matter of another application for patent, Serial No. 186,016, filed of even date herewith, and although not herein claimed, is not hereby dedicated to the public.

To render fluid-tight the joints between the casing $c$ and the valve seats $m$ and between the valve seats $m$ and the ribs $b$, the following construction is provided.

The inner end of each valve seat $m$ is provided with an outwardly extending annular flange $n$. In Figure 1 the outer face of this flange is stepped to form two concentric shoulders. The valve casing, at the inner edge of each opening that receives a valve seat, is recessed circumferentially to receive that one of the shoulders which adjoins the body of the valve seat, as more clearly shown in Fig. 1<sup>A</sup>, and between this shoulder and the recess a gasket $o$ is confined.

The valve casing, at the outer edge of each opening that receives a valve seat, is recessed circumferentially. The inner end of the corresponding ring $b$ is provided with an annular projection $p$ that extends into said recess and confines therein a gasket $q$.

The inner end of each ring $b$, around its outer edge, is bevelled and the circumferential space between this end of the ring and the opposing face of the valve casing receives a weld $r$.

The outer end of each ring may be circumferentially recessed along its inner edge to receive a weld $s$.

The above construction guards against leakage from within the valve casing and from within the conduit outside the valves.

The construction shown in Fig. 2 differs from that shown in Figs. 1 and 1<sup>A</sup> in that the valve seats, marked $t$, are interiorly threaded to receive the pipes. The rings, marked $u$, are, like rings $b$, bevelled around the outer edges of their inner ends to receive a weld $v$.

The inner end of each valve seat $m$ is provided with an outwardly extending annular flange $w$, which extends within a circumferential recess in the valve casing and confines in said recess a gasket $x$. A weld $y$ may be applied at the joint between the outer face of flange $w$ and the inner face of the valve casing. The outer ends of valve seats $t$ and rings $u$ are provided with opposing bevels to form a groove to receive a weld $z$.

Having now fully described my invention, what I claim and desire to protect by Letters Patent is:

1. A valve structure comprising a valve casing having openings in opposite sides, valve seats within and extending through the casing openings, external rings sleeved on the ends of the valve seats projecting outside the casing, the valve casing having a circumferential recess at the inner edge of each opening, a flange on the valve seat engaging such recess, a gasket confined in said recess by said flange, and circumferential welds at the joints between the outer walls of the casing and the inner ends of the rings.

2. A valve structure comprising a valve casing having openings in opposite sides, valve seats within and extending through the casing openings, external rings sleeved on the ends of the valve seats projecting outside the casing, the valve casing having a circumferential recess at the inner edge of each opening, a flange on the valve seat engaging such recess, a gasket confined in said recess by said flange, the inner end of each ring having a circumferential bevel at its outer edge, and a weld between said bevel and the opposing outer wall of the casing.

3. A valve structure comprising a valve casing having openings in opposite sides, valve seats within and extending through the casing openings, external rings sleeved on the ends of the valve seats projecting outside the casing, the valve casing having a circumferential recess at the inner edge of each opening, a flange on the valve seat engaging such recess, the outwardly facing side of said flange being stepped to form outwardly facing concentric shoulders, one of which extends into said recess, and a gasket confined in said recess by said shoulder.

4. A valve structure comprising a valve casing having openings in opposite sides, valve seats within and extending through said openings, external rings sleeved on the ends of the valve seats projecting outside the casing, the valve casing having circumferential recesses at the inner and outer edges of each opening, an annular flange on the valve seat engaging the inner of said recesses, an annular projection on the inner end of the ring engaging the outer of said recesses, and a gasket confined in each recess.

In testimony of which invention, I have hereunto set my hand, at Philadelphia, Pa., on this 13th day of April, 1927.

GUNNAR ERICSSON.